United States Patent
Chen et al.

(10) Patent No.: US 11,557,924 B2
(45) Date of Patent: Jan. 17, 2023

(54) WIRELESS CHARGING RECEIVING APPARATUS, METHOD FOR REALIZING WIRELESS CHARGING, AND MOBILE TERMINAL

(71) Applicant: ZTE CORPORATION, Guangdong (CN)

(72) Inventors: Bingkuan Chen, Guangdong (CN); Tao Chen, Guangdong (CN)

(73) Assignee: ZTE CORPORATION, Shenzhen (CN)

( * ) Notice: Subject to any disclaimer, the term of this patent is extended or adjusted under 35 U.S.C. 154(b) by 163 days.

(21) Appl. No.: 16/967,729

(22) PCT Filed: Apr. 26, 2019

(86) PCT No.: PCT/CN2019/084559
§ 371 (c)(1),
(2) Date: Aug. 6, 2020

(87) PCT Pub. No.: WO2020/010898
PCT Pub. Date: Jan. 16, 2020

(65) Prior Publication Data
US 2021/0044155 A1 Feb. 11, 2021

(30) Foreign Application Priority Data
Jul. 9, 2018 (CN) .......................... 201810746388.8

(51) Int. Cl.
*H02J 50/40* (2016.01)
*H02J 50/10* (2016.01)
*H02J 7/04* (2006.01)

(52) U.S. Cl.
CPC .............. *H02J 50/402* (2020.01); *H02J 7/04* (2013.01); *H02J 50/10* (2016.02)

(58) Field of Classification Search
CPC .............. H02J 50/402; H02J 50/10; H02J 7/04
(Continued)

(56) References Cited

U.S. PATENT DOCUMENTS 10,644,531 B1 * 5/2020 Qiu ........................ H02M 7/25
2011/0156493 A1 * 6/2011 Bennett ................... H02J 7/025
307/104

(Continued)

FOREIGN PATENT DOCUMENTS

CN 102437657 A 5/2012
CN 205231777 U 5/2016
(Continued)

OTHER PUBLICATIONS

International search report of PCT Patent Application No. PCT/CN2019/084559 dated Jul. 10, 2019.

*Primary Examiner* — Richard Isla
*Assistant Examiner* — Manuel Hernandez

(57) ABSTRACT

A wireless charging receiving apparatus includes a wireless charging conversion module, a charging management module, a voltage combination module and at least two wireless charging receiving coils. The at least two wireless charging receiving coils are used to couple with a wireless charging transmitting coil in a wireless charging transmitting apparatus and output alternating-current electromagnetic induction signals to the voltage combination module; the voltage combination module is used to carry out voltage superposition on the alternating-current electromagnetic induction signals output by the at least two wireless charging receiving coils and output superposed alternating-current electrical signals to the wireless charging conversion module; the wireless charging conversion module is used to convert received alternating-current electrical signals into direct-current electrical signals, and output the direct-current electrical signals to the charging management module; and the (Continued)

charging management module is used to charge a battery by means of received direct-current electrical signals.

12 Claims, 10 Drawing Sheets

(58) Field of Classification Search
USPC .......................................... 320/108; 307/104
See application file for complete search history.

(56) References Cited

U.S. PATENT DOCUMENTS

| | | | |
|---|---|---|---|
| 2013/0043734 A1* | 2/2013 | Stone ...................... | H02J 50/40 |
| | | | 307/104 |
| 2014/0375255 A1* | 12/2014 | Leabman ................ | H02J 50/90 |
| | | | 320/108 |
| 2019/0052116 A1* | 2/2019 | Bae ......................... | H02J 50/10 |
| 2019/0173314 A1* | 6/2019 | Nejatali .................. | H02J 50/12 |

FOREIGN PATENT DOCUMENTS

| | | | | | |
|---|---|---|---|---|---|
| CN | 104218685 B | * | 7/2017 | ............ | H01F 27/36 |
| CN | 106953419 A | | 7/2017 | | |
| CN | 107979394 A | | 5/2018 | | |

\* cited by examiner

WIRELESS CHARGING RECEIVING APPARATUS, METHOD FOR REALIZING WIRELESS CHARGING, AND MOBILE TERMINAL

CROSS-REFERENCE TO RELATED APPLICATIONS

This application claims the priority of Chinese patent application CN 201810746388.8, entitled "Wireless Charging Receiving Apparatus, Method for Realizing Wireless Charging, and Mobile Terminal" and filed on Jul. 9, 2018, the entirety of which is incorporated herein by reference.

FIELD OF THE INVENTION

The present disclosure relates to the technical field of charging, and in particular, to a wireless charging receiving apparatus, a method for realizing wireless charging, and a mobile terminal.

BACKGROUND OF THE INVENTION

A mobile terminal wireless charging technology refers to charging a mobile terminal wirelessly, and may generally include an electromagnetic induction manner and a magnetic resonance manner. The electromagnetic induction manner is more common.

For the wireless charging technology using the electromagnetic induction manner, medium power wireless charging with a receiving terminal having a power of greater than 5 W and less than 15 W is mostly used currently. However, in actual use, the wireless charging is accompanied by serious heat generation. For example, when testing is performed to a 7.5 W fast charger of a brand, charging can only be maintained for 8 to 10 minutes, and the mobile terminal has reached a temperature above 60° C. at that time.

When testing is performed to a wireless charging product less than 5 W, it is also found that heat generation is very serious as well when an output current is large. For example, when the output current is 1 A, a surface of the charger has reached 56° C. in about an hour, and a battery sensor has reached a temperature of 50° C.

Serious heat generation occurs when the mobile terminal is charged wirelessly. On one hand, the mobile terminal is very hot after being removed from a charging panel, which affects the user experience; and on the other hand, long-time charging may cause battery bulging, which affects the battery life.

At present, a common technology for solving the heat generation problem of a wireless charging fast charger is to place a "metal shield" apparatus between a wireless charging receiving coil and a battery to block magnetic field lines and prevent the magnetic field lines from reaching the battery. This "metal shield" apparatus is made of a high-permeability ferrite, and a manganese-zinc ferrite is usually used because it has a high initial permeability. However, because the manganese-zinc ferrite has a small resistivity, an eddy current will still be generated in the ferrite, which causes heat generation in the ferrite. This method cannot fundamentally avoid a circumstance of heat generation for the wireless charging fast charger.

SUMMARY OF THE INVENTION

Embodiments of the present disclosure provide a wireless charging receiving apparatus, a method for realizing wireless charging and a mobile terminal, so as to realize wireless charging with less heat generation.

An embodiment of the present disclosure provides a wireless charging receiving apparatus, including a wireless charging conversion module and a charging management module which are interconnected and further including a voltage combination module and at least two wireless charging receiving coils, wherein the at least two wireless charging receiving coils are respectively connected to the voltage combination module, and are used to couple with a wireless charging transmitting coil in a wireless charging transmitting apparatus and output alternating-current electromagnetic induction signals to the voltage combination module;

the voltage combination module is connected to the wireless charging conversion module, and is used to carry out voltage superposition on the alternating-current electromagnetic induction signals output by the at least two wireless charging receiving coils and output superposed alternating-current electrical signals to the wireless charging conversion module;

the wireless charging conversion module is used to convert received alternating-current electrical signals into direct-current electrical signals and output the direct-current electrical signals to the charging management module; and the charging management module is used to charge a battery by means of received direct-current electrical signals.

An embodiment of the present disclosure further provides a method for realizing wireless charging, including steps of:

carrying out voltage superposition on alternating-current electromagnetic induction signals output by at least two wireless charging receiving coils;

converting alternating-current electrical signals obtained by superposition into direct-current electrical signals; and charging a battery by means of the direct-current electrical signals.

An embodiment of the present disclosure further provides a mobile terminal, including the above wireless charging receiving apparatus.

The wireless charging receiving apparatus according to an embodiment of the present disclosure includes a wireless charging conversion module and a charging management module which are interconnected, and further includes a voltage combination module and at least two wireless charging receiving coils. The at least two wireless charging receiving coils are respectively connected to the voltage combination module, and are used to couple with a wireless charging transmitting coil in a wireless charging transmitting apparatus and output alternating-current electromagnetic induction signals to the voltage combination module; the voltage combination module is connected to the wireless charging conversion module, and is used to carry out voltage superposition on the alternating-current electromagnetic induction signals output by the at least two wireless charging receiving coils and output superposed alternating-current electrical signals to the wireless charging conversion module; the wireless charging conversion module is used to convert received alternating-current electrical signals into direct-current electrical signals and output the direct-current electrical signals to the charging management module; and the charging management module is used to charge a battery by means of received direct-current electrical signals. By means of the present embodiment, a circumstance of serious heat generation during current wireless charging of a fast charger can be alleviated, so as to realize wireless charging with less heat generation.

Other features and advantages of the present disclosure will be further explained in the following description, and partially become self-evident therefrom, or be understood through the embodiments of the present disclosure. The objectives and other advantages of the present disclosure will be achieved and obtained through the structure specifically pointed out in the description, claims, and the accompanying drawings.

BRIEF DESCRIPTION OF THE DRAWINGS

The accompanying drawings are used to provide further understandings of technical solutions of the present disclosure and constitute one part of the description. The drawings are used for interpreting the technical solutions of the present disclosure together with the embodiments, not for limiting the technical solutions of the present disclosure.

DETAILED DESCRIPTION OF THE EMBODIMENTS

Embodiments of the present disclosure will be illustrated in detail hereinafter in combination with the accompanying drawings to make the purpose, technical solutions, and advantages of the present disclosure more clear. It should be noted that, as long as there is no conflict, the embodiments and the technical features mentioned in the embodiments may be combined with one another in any manner.

Figure 1:
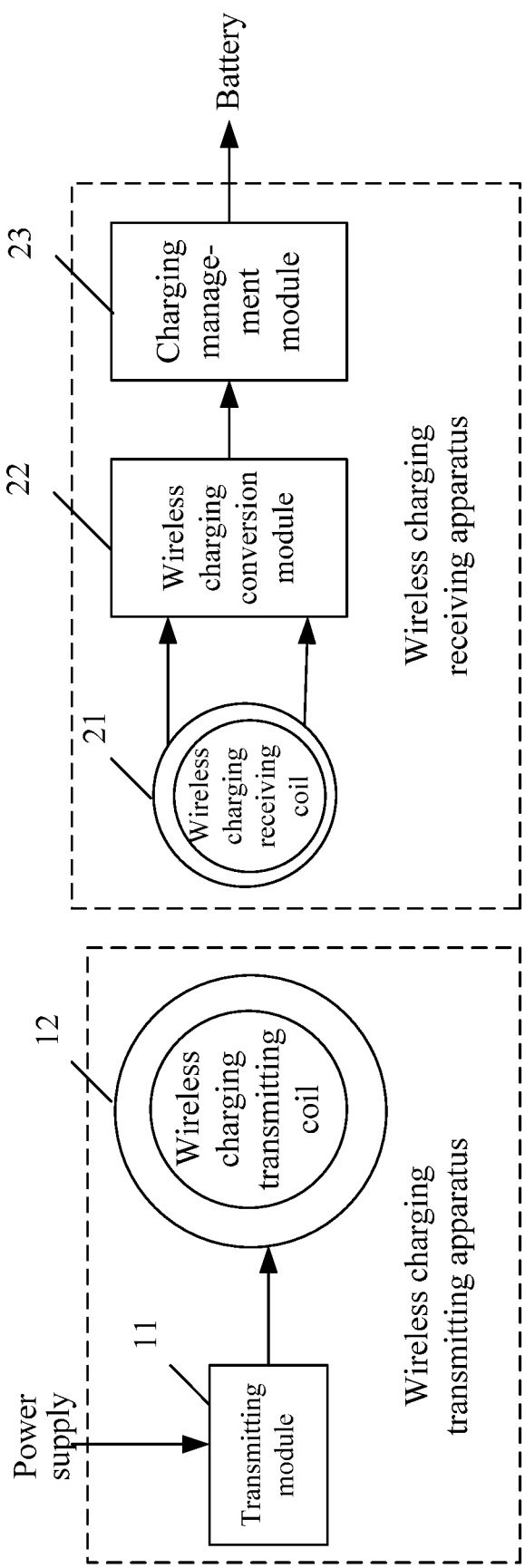
FIG. 1 is a schematic diagram of a single-coil wireless charging solution.

At present, a solution that a receiving terminal has a single coil is generally adopted for wireless charging, and the receiving terminal is located at a center of a battery. As shown in FIG. 1, a wireless charging transmitting apparatus includes a transmitting module 11 and a wireless charging transmitting coil 12. The transmitting module 11 receives power from a power supply, and outputs electric signals to the wireless charging transmitting coil 12. A wireless charging receiving apparatus includes a wireless charging receiving coil 21, wireless charging conversion module 22 and a charging management module 23. The wireless charging receiving coil 21 is coupled with the wireless charging transmitting coil 12, and outputs alternating-current electromagnetic induction signals to the wireless charging conversion module 22. The wireless charging conversion module 22 converts received alternating-current electrical signals into direct-current electrical signals, and outputs the direct-current electrical signals to the charging management module 23. The charging management module 23 charges the battery by means of received direct-current electrical signals.

This single-coil solution in FIG. 1 has serious heat generation at a receiving coil terminal. Moreover, the coil is very sensitive to a displacement degree, so that charging is stopped once displacement reaches a certain degree.

Figure 2:
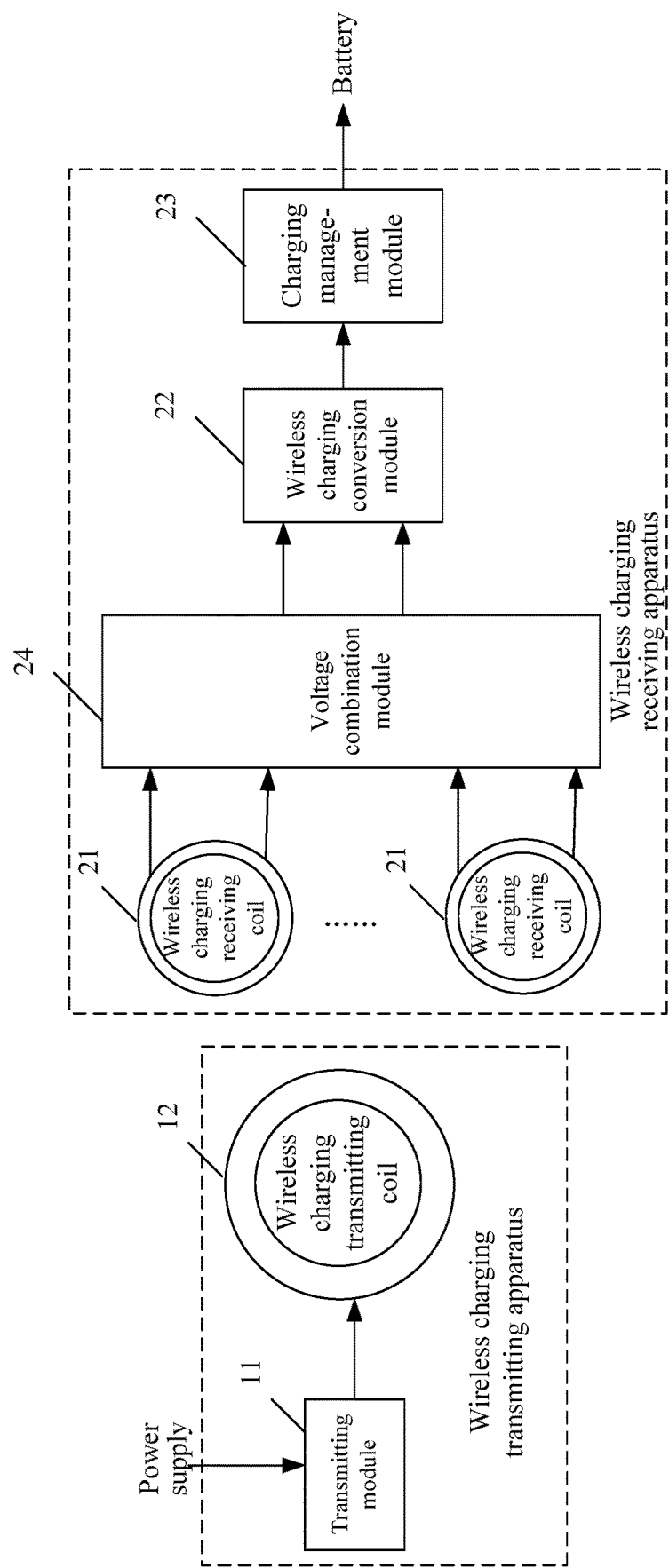
FIG. 2 is a schematic diagram of multiple-coil solution according to an embodiment of the present disclosure.

In an embodiment of the present disclosure, at least two wireless charging receiving coils are used to reduce heat generation. As shown in FIG. 2, a wireless charging receiving apparatus in the present embodiment includes a wireless charging conversion module 22 and a charging management module which are interconnected, and further includes a voltage combination module 24 and at least two wireless charging receiving coils 21.

The at least two wireless charging receiving coils 21 are respectively connected to the voltage combination module 24, and are used to couple with a wireless charging transmitting coil 12 in a wireless charging transmitting apparatus and output alternating-current electromagnetic induction signals to the voltage combination module 24;

the voltage combination module 24 is connected to the wireless charging conversion module 22, and is used to carry out voltage superposition on the alternating-current electromagnetic induction signals output by the at least two wireless charging receiving coils 21 and output superposed alternating-current electrical signals to the wireless charging conversion module 22;

the wireless charging conversion module 22 is used to convert received alternating-current electrical signals into direct-current electrical signals and output the direct-current electrical signals to the charging management module 23; and the charging management module 23 is used to charge a battery by means of received direct-current electrical signals.

In the present embodiment, multiple wireless charging receiving coils are used. In comparison to the single-coil solution, the number of windings for each of the wireless charging receiving coils is reduced, and current generated by each of the coils is reduced correspondingly, so that a temperature of heat generation of the coils is reduced.

An example where wireless charging receiving coils are double coils is illustrated below.

The wireless charging transmitting coil 12 in the wireless charging transmitting apparatus is a single coil, and the number of windings of the single coil is $N_a$. An alternating-current current signal provided to the wireless charging transmitting coil 12 by a power supply is:

$$i_a = I_a \sin(wt + \varphi) \tag{1}$$

in which, $I_a$ is an amplitude, w being an angular frequency, t being a time value, $\varphi$ being an initial phase.

A magnetic field intensity generated by the wireless charging transmitting coil 12 in space is:

$$B(r) = h(r)i_a \qquad (2),$$

in which, h(r) is a coefficient associated with a function r for a distance between a certain point in space and a center of the transmitting coil.

It is supposed that the number of windings of the single coil in the originally used solution of performing a reception by the single coil is $N_b$. The number of windings of each of the two coils used at a receiving terminal in the present embodiment is half of $N_b$, i.e., $$\frac{N_b}{2},$$

and an area and an impedance remain the same. At this time, an induction voltage generated in this wireless charging receiving coil by a changing magnetic field that is produced due to an alternating current in space is:

$$u_b = \frac{N_b}{2}\frac{\Delta\phi}{\Delta t} = \qquad (3)$$
$$\frac{N_b}{2}\int_S \frac{d(B_t(r_S)dS)}{dt} = \frac{N_b}{2}\frac{di_a}{dt}\int_S (h_t(r_S)dS) = k(r_b)\cos(wt+\varphi),$$

in which $k(r_b)$ is a coefficient associated with a function $r_b$ for a distance between a center of the receiving coil and a center of the transmitting coil.

Induction voltages generated on two receiving coils are respectively $u_{b1}$ and $u_{b2}$. Since sine waves of the two induction voltages have the same frequency and phases, after the two induction voltages pass through the voltage combination module, a voltage can be obtained:

$$u = u_{b1} + u_{b2} = [k(r_{b1}) + k(r_{b2})]\cos(wt + \varphi) \qquad (4).$$

Accordingly, when the two receiving coils coincide, an induction voltage generated is:

$$u = 2k(r_b)\cos(wt+\varphi) \qquad (5).$$

This voltage is the same as the voltage in the single-coil solution, but the voltage generated by each coil is half of the voltage generated in the single-coil solution. An impedance of each coil remains the same, and thus a current generated in each coil is half of an original current. Thus, heat generated by each coil is as follows:

$$Q_1 = I^2 Rt = \frac{Q}{4},$$

and all the heat generated is half of that originally generated. As can be seen, when two coils, which coincide, are used for the wireless charging receiving apparatus, heat generation of the mobile terminal can be reduced obviously.

The wireless charging receiving coils 21 may be copper wires or an FPC (flexible printed circuit board). By coupling with the wireless charging transmitting apparatus (for example, a wireless charging base), the wireless charging receiving coils 21 receive high-frequency electromagnet waves generated by the wireless charging transmitting apparatus.

In the present embodiment, the voltage combination module may include an addition operation circuit.

Since induction voltages generated by multiple wireless charging receiving coils 21 have the same frequency and phase, the addition operation circuit in the voltage combination module can be used to add the induction voltages generated by multiple coils to obtain an output voltage.

Figure 3:
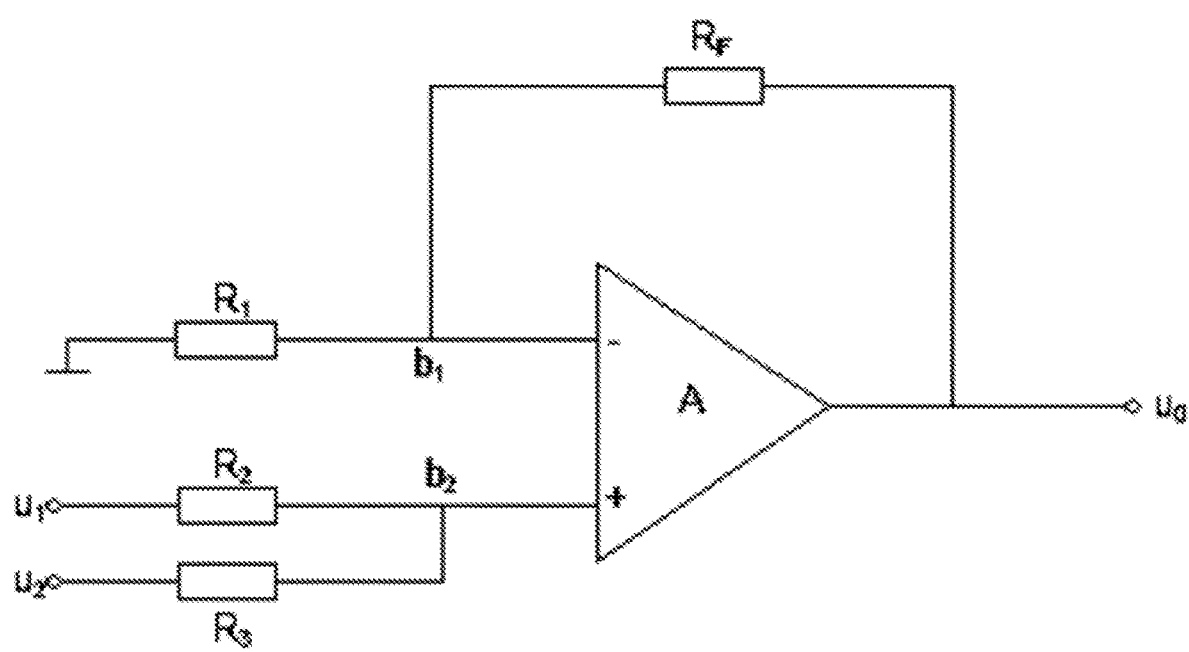
FIG. 3 is a schematic diagram of components of a voltage combination module according to an embodiment of the present disclosure.

As shown in FIG. 3, the wireless charging receiving coils are double coils. The addition operation circuit may include an integrated operational amplifier A, a first resistance $R_1$, a second resistance $R_2$, a third resistance $R_3$ and a fourth resistance $R_F$. Two induction voltages $u_1$ and $u_2$ generated by the double coils are applied to a non-inverting end of the above integrated operational amplifier, so as to form a non-inverting input addition circuit. After the two induction voltages $u_1$ and $u_2$ pass through the above circuit, a voltage obtained at an output end is:

$$u_o = \left(1 + \frac{R_F}{R_1}\right)(K_1 u_1 + K_2 u_2), \qquad (6)$$

in which $$K_1 = \frac{R_3}{R_2 + R_3}, \text{ and } K_2 = \frac{R_2}{R_2 + R_3}.$$

An output voltage $u_o$ generated at the output end is converted into direct-current electrical signals by the wireless charging conversion module 22, and the wireless charging conversion module 22 usually outputs direct-current voltage signals of 5V, 9V, or 12V.

The charging management module 23 charges the battery by means of received direct-current electrical signals output by the wireless charging conversion module 22

In the present embodiment, the at least two wireless charging receiving coils 21 are superposed, and central axes thereof coincide or do not coincide.

When the wireless charging receiving coils 21 is located at a position far away from a center of the wireless charging transmitting coil 12, conversion efficiency is low. In order to keep a power received by the wireless charging receiving coils 21 unchanged, it is required to increase a power of the wireless charging transmitting apparatus to a great extent, so that serious heat generation occurs. In order to prevent this circumstance, in an embodiment of the present disclosure, the wireless charging receiving apparatus may further include a detection module, a decision-making module and a baseband processor which are connected sequentially.

Figure 4:
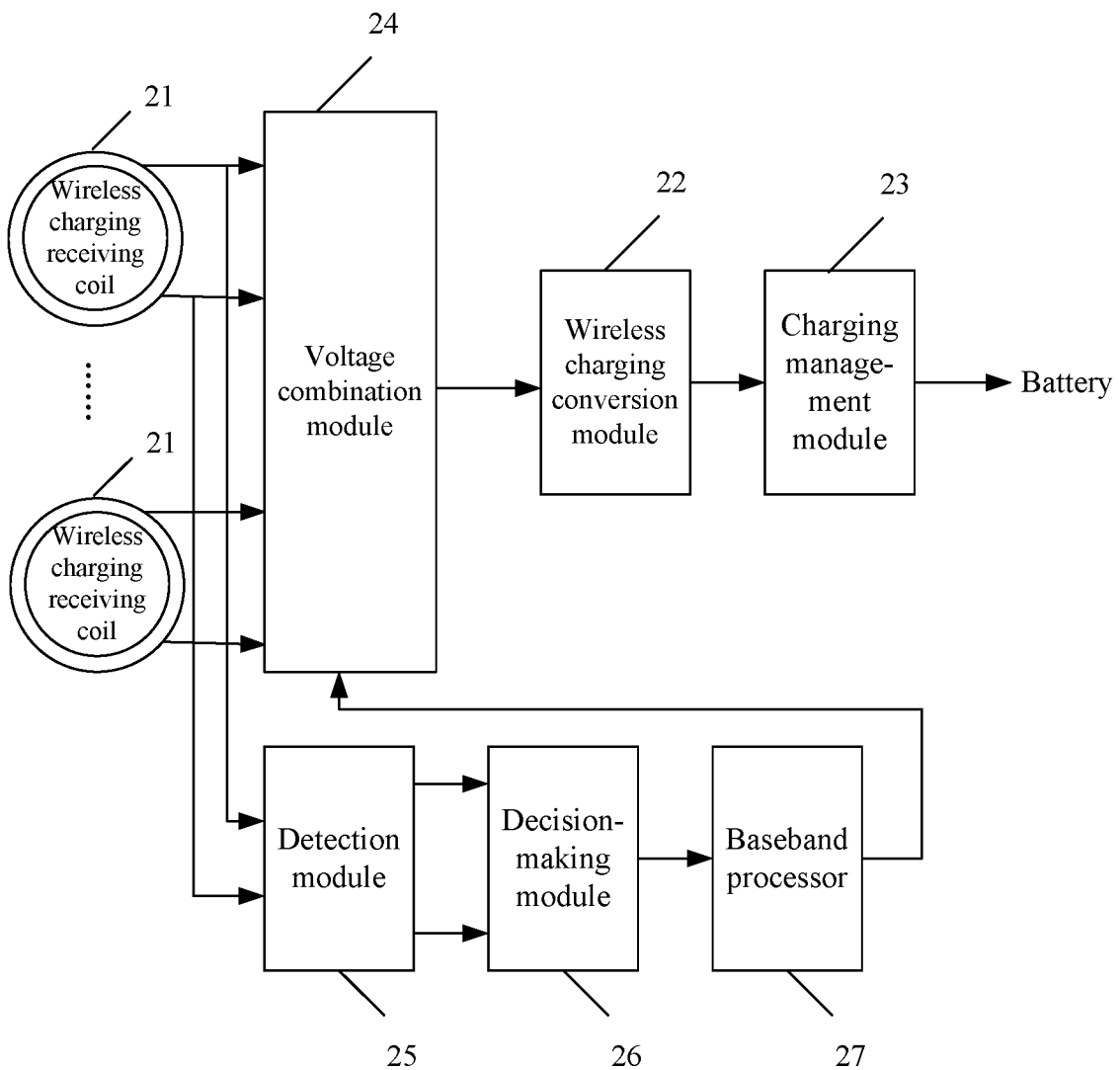
FIG. 4 is a schematic diagram of a wireless charging receiving apparatus according to an embodiment of the present disclosure.

As shown in FIG. 4, when central axes of the at least two wireless charging receiving coils 21 coincide, the detection module 25 is connected to one of the at least two wireless charging receiving coils 21, and is used to detect a magnetic induction intensity of the wireless charging receiving coil 21 connected thereto;

the decision-making module 26 is used to determine that a criterion for stopping charging is met based on the magnetic induction intensity detected by the detection module 25 and give the baseband processor 27 a notice to stop wireless charging; and the baseband processor 27 is connected to the voltage combination module 24, and is used to control the voltage combination module 24 to stop wireless charging based on the notice given by the decision-making module 26.

Since the at least two wireless charging receiving coils 21 coincide, detection of the magnetic induction intensity may only be performed to one of the at least two wireless charging receiving coils.

A Hall device may be used as the detection module 25 to measure the magnetic induction intensity.

In an embodiment, the decision-making module 26 is used to determine a maximum value of a magnetic flux through the wireless charging receiving coil 21 based on the magnetic induction intensity and an area of the wireless charging receiving coil and determine that the criterion for stopping charging is met when the maximum value of the magnetic flux is smaller than a first threshold.

The maximum value of the magnetic flux through the wireless charging receiving coil 21 may be obtained by multiplying the magnetic induction intensity and the area of the wireless charging receiving coil.

The first threshold is a predetermined value, and may be set based on actual heat generation and power requirements.

The decision-making module 26 may determine the maximum value of the magnetic flux through the wireless charging receiving coil 21 in real time. When the maximum value of the magnetic flux is smaller than the first threshold, the notice to stop wireless charging is given to the baseband processor 27; and when the maximum value of the magnetic flux is larger than or equal to the first threshold, a notice to continue wireless charging is given to the baseband processor 27.

When the double coils coincide, the circumstance is similar to the single-coil solution, because the double coils are tightly coupled coils. In this situation, the coils are very sensitive to a displacement in use, so that charging is stopped once displacement occurs, which affects the user experience. Therefore, a setting that the double coils overlap may be used for the wireless charging receiving apparatus.

Figure 5:
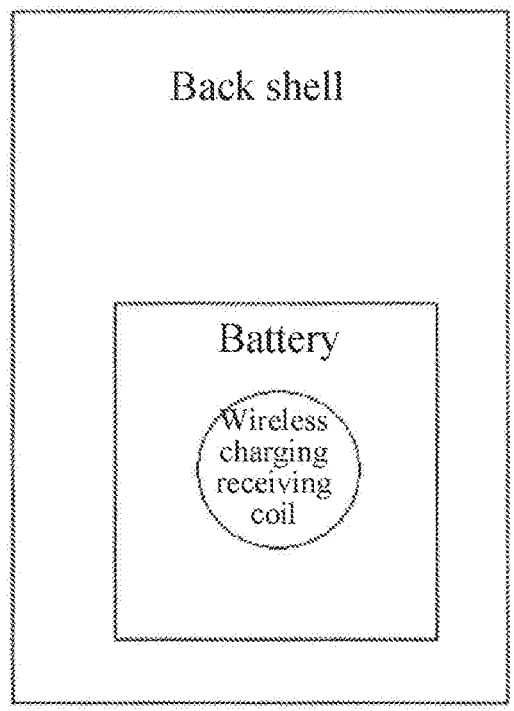
FIG. 5(a) is a schematic diagram of a wireless charging receiving coil being a single coil or of wireless charging receiving coils which coincide.
FIG. 5(b) is a schematic diagram of wireless charging receiving coils being double coils which overlap.
Figure 5:
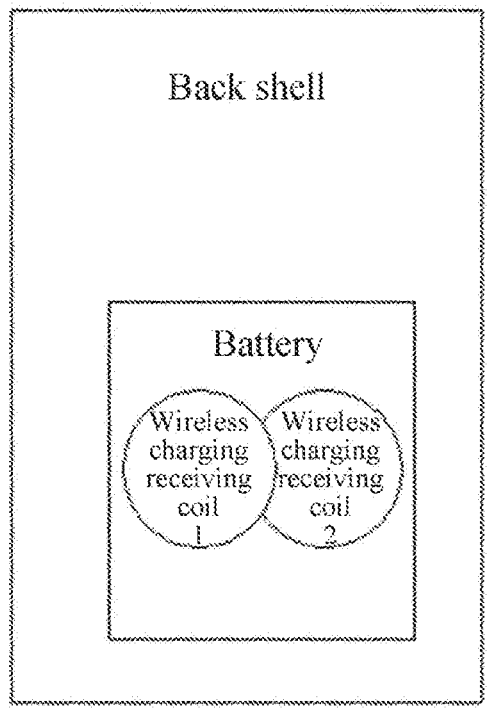

FIG. 5(a) is a schematic diagram of a wireless charging receiving coil being a single coil or of wireless charging receiving coils which coincide, in which tightly coupled coils are used.

FIG. 5(b) is a schematic diagram of wireless charging receiving coils being double coils which overlap. Central axes of the two wireless charging receiving coils do not coincide. In the present embodiment, a distance between the central axes of the two wireless charging receiving coils may be smaller than or equal to 20 mm. For example, the distance may be in a range from 10 mm to 20 mm.

If a wireless charging receiving coil and a wireless charging transmitting coil are separated from each other for a certain distance, only a portion of magnetic flux generated by the transmitting coil can reach the receiving coil, so as to achieve power transmission. More magnetic flux received by the receiving coil indicates a higher degree of coupling between the wireless charging receiving coil and the wireless charging transmitting coil. A coupling level is indicated by a coupling factor k. The coupling factor is associated with a distance between the wireless charging receiving coil and the wireless charging transmitting coil and relative sizes thereof, and is also associated with shapes of the wireless charging receiving coil and the wireless charging transmitting coil and an angle therebetween. If the central axes of the wireless charging receiving coil and the wireless charging transmitting coil are aligned with each other initially, any displacement may cause a decrease in a value of k.

A definition of the coupling factor is expressed as:

$$k = \frac{L_{12}}{\sqrt{L_{11}L_{12}}} \quad (7)$$

This expression is deformed from ordinary equations related to a coupled inductor:

$$\frac{U_1}{jw} = L_{11}I_2 + L_{12}I_2 \text{ and} \quad (8)$$

$$\frac{U_2}{jw} = L_{12}I_1 + L_{22}I_2, \quad (9)$$

in which $U_1$ and $U_2$ represent voltages received by the two coils, $I_1$ and $I_2$ representing currents flowing into the two coils, $L_1$ and $L_2$ being self-inductance coefficients of the two coils, $L_{12}$ is a coefficient of mutual inductance of two coupled coils, an angular frequency $\omega=2\pi f$.

The coupling factor may be calculated by an existing equation regarding an open-loop voltage u:

$$u = \frac{U_2}{U_1} = k\sqrt{\frac{L_2}{L_1}}. \quad (10)$$

If self-inductance values of the two coils are equal, the open-loop voltage u is equal to k.

Figure 6:
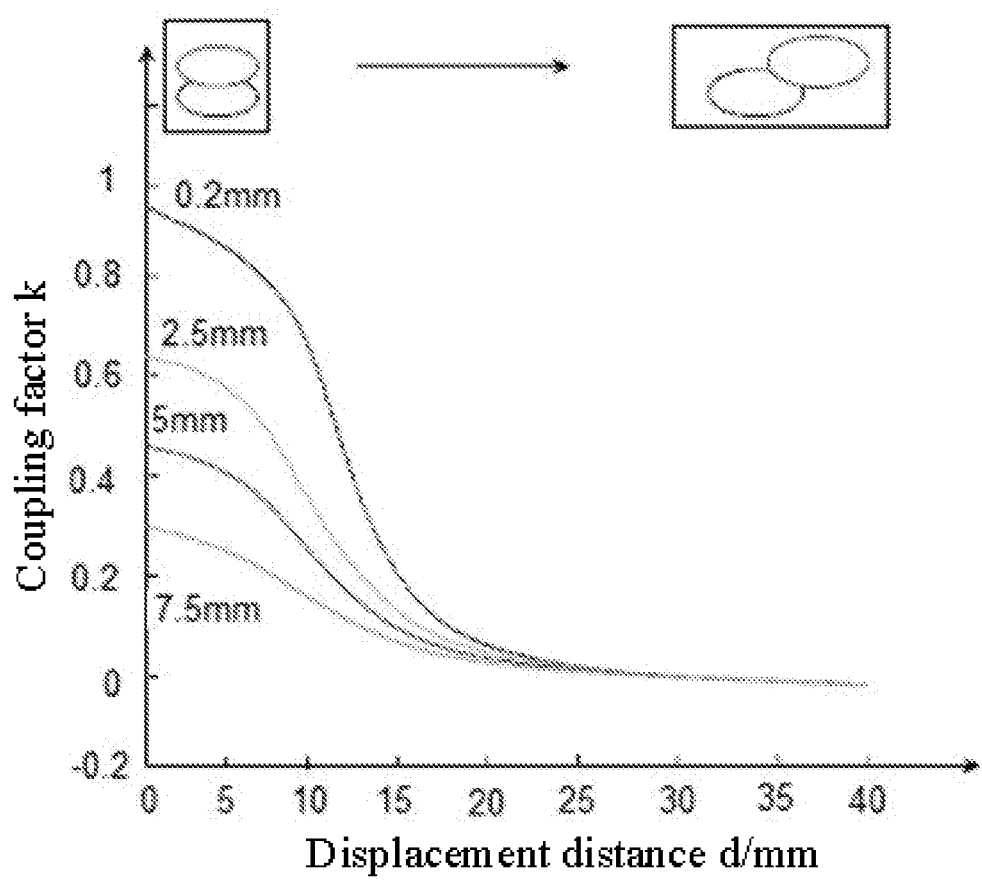
FIG. 6 is a view of variation of a coupling factor with variation of a displacement distance of the receiving coil.

FIG. 6 shows an effect of displacement by taking planar coils having a diameter of 30 mm. FIG. 6 shows a curve graph of the coupling factor at different displacement distances in the horizontal direction between two parallel coils.

As can be seen from FIG. 6, the larger the displacement distance between the wireless charging receiving coil and the wireless charging transmitting coil is, the smaller the coupling factor is; and accordingly, transmission efficiency is lower.

Figure 7:
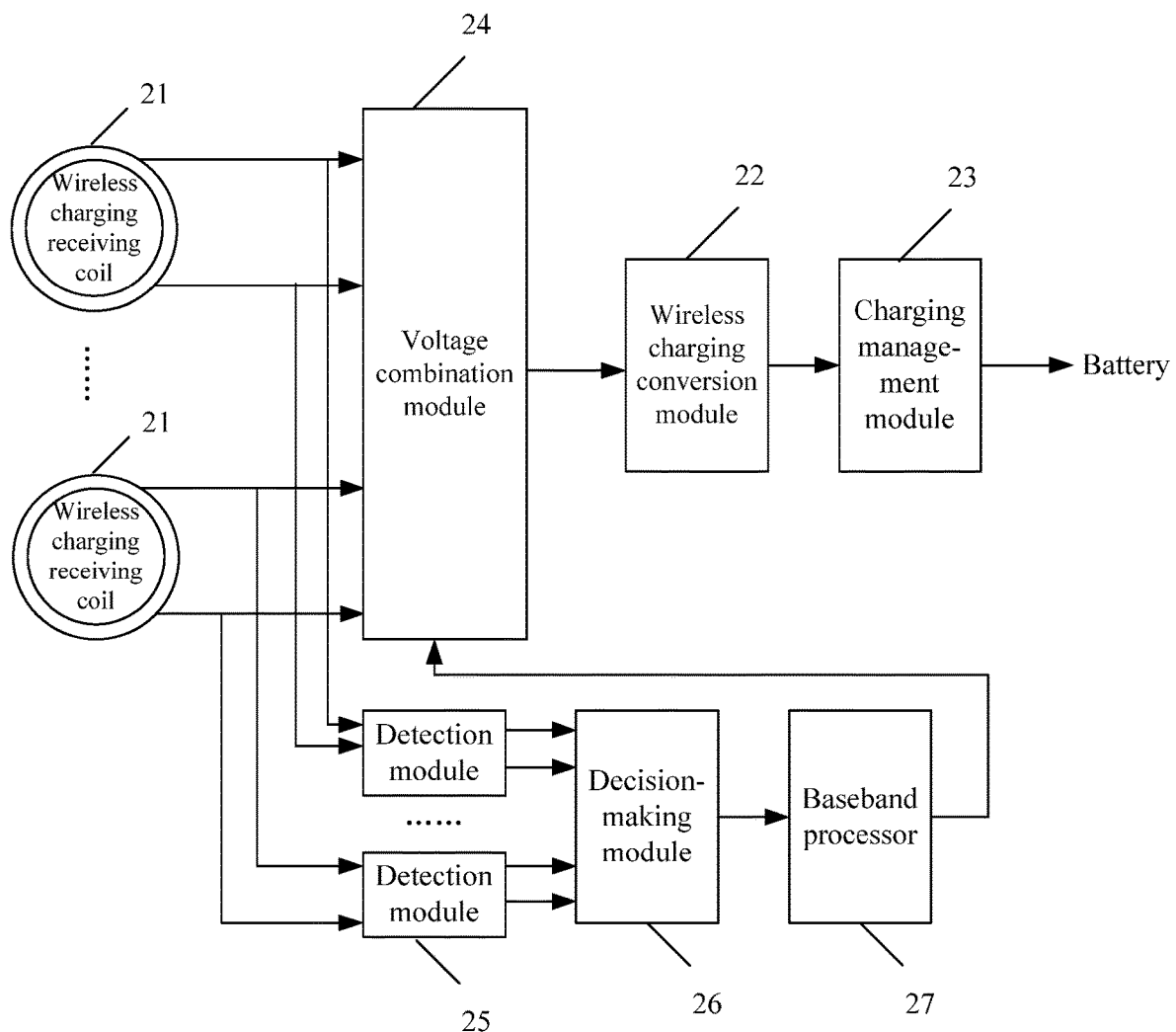
FIG. 7 is a schematic diagram of a wireless charging receiving apparatus according to another embodiment of the present disclosure.

In a solution that the wireless charging receiving coils overlap, magnetic fluxes of the at least two wireless charging receiving coils are different. To detect and calculate the magnetic fluxes of the at least two wireless charging receiving coils at the same time, multiple detect modules are used. As shown in FIG. 7, at least two detection modules 25, a decision-making module 26 and a baseband processor 27 are included.

The detection modules 25 are in an one-to-one relationship with the wireless charging receiving coils 21, and each of the detection modules 25 is connected to one of the wireless charging receiving coils 21 and is used to detect an magnetic induction intensity of the wireless charging receiving coil 21 connected thereto;

the decision-making module 26 is used to determine that a criterion for stopping charging is met based on magnetic induction intensities detected by the detection modules 25 and give the baseband processor 27 a notice to stop wireless charging; and the baseband processor 27 is connected to the voltage combination module 24, and is used to control the voltage combination module 24 to stop wireless charging based on the notice given by the decision-making module 26.

In an embodiment, the decision-making module 26 is used to determine a maximum value of a magnetic flux through each of the wireless charging receiving coils 21 based on the magnetic induction intensity detected by each of the detection module 25 and an area of each of the wireless charging receiving coils 21, and determine that the criterion for stopping charging is met when a sum of maximum values of magnetic fluxes through respective wireless charging receiving coils 21 is smaller than a second threshold.

The second threshold is a predetermined value, and may be set based on actual heat generation and power requirements.

When the sum of the maximum values of the magnetic fluxes through respective wireless charging receiving coils 21 is larger than or equal to the second threshold, a notice to perform wireless charging is given to the baseband processor 27.

Figure 8:
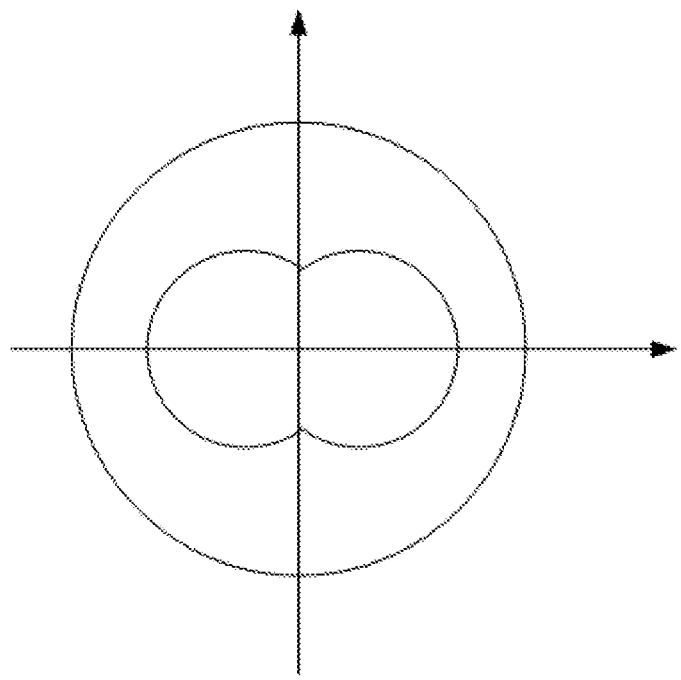
FIG. 8(a) is a schematic diagram of a solution that double coils overlap, in which a geometric center of double coils and a center of a wireless charging transmitting coil coincide.
FIG. 8(b) is a schematic diagram of the solution that double coils overlap, in which displacement between a geometric center of double coils and a center of a wireless charging transmitting coil occurs.
Figure 8:
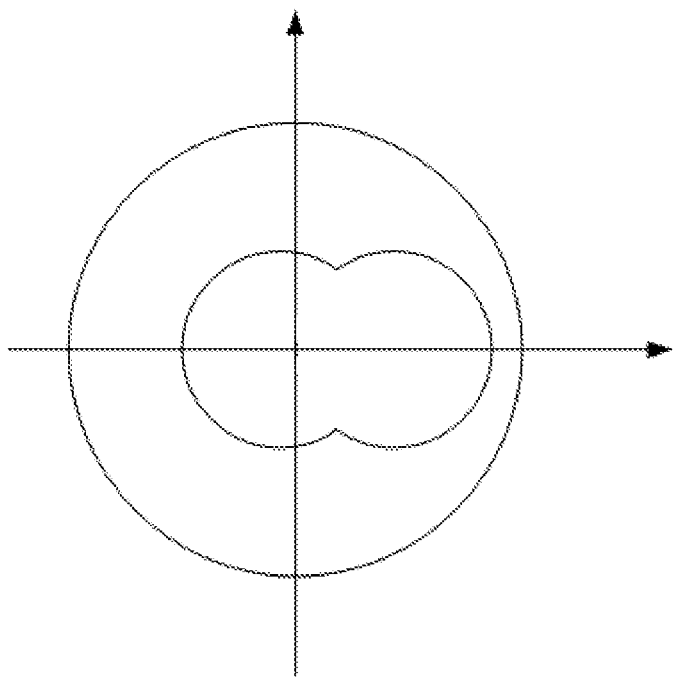

In an example where the wireless charging receiving coils are double coils, when the double coils overlap, if the number of windings is the same as the number of windings when the double coils coincide, an induction voltage generated would be lower than an induction voltage generated when the double coils coincide, and charging efficiency would be reduced at this time. Thus, in the present embodiment, in order to ensure that the induction voltage generated in the solution that the double coils overlap, in which a geometrical center of the double coils is in an exact center as shown in FIG. 8(a), is the same as the induction voltage generated when the double coils coincide, the number of windings is increased on the basis of the solution that the double coils coincide, so as to ensure that the induction voltage generated is the same as the induction voltage generated when the double coils coincide. A resistance remains the same at this time, and the induction voltage generated by each coil also remains the same. Thus, compared with the solution that the double coils coincide, heat generated remains the same. When the mobile terminal is displaced for a certain distance, as shown in FIG. 8(b), the magnetic flux of one of the double coils would increase, and the magnetic flux of the other of the double coils would decrease; and a magnetic flux in the solution that the double coils coincide would also decrease. Thus, the magnetic fluxes in the two solutions after the mobile terminal is displaced can be compared theoretically. A verification process is as follows.

When the geometrical center of the receiving coils are closer to the center of the transmitting coil, a magnetic flux Φ through a single winding of each of the receiving coils has an approximately linear relationship with a displacement distance d, and it is supposed that a relational expression thereof is:

$$\Phi = -k|d| + m \tag{11},$$

in which m is a constant.

Since a phenomenon that wireless charging is stopped may occur when there is a displacement of 5 mm, analysis is performed by taking a distance of 10 mm between centers of the double coils as an example. Supposing that the number of the windings in the single-coil solution is N, the number of the windings in the solution that double coils coincide is N/2; and meanwhile it is supposed that the number of windings for each coil in the solution that the coils overlap is $N_d$. In order to ensure that the magnetic fluxes in the two solutions are the same when the geometrical center is in the center, i.e., $\Phi_1 = \Phi_2$, the following relation is provided:

$$2m \times \frac{N}{2} = 2 \times (-5k + m)N_d. \tag{12}$$

Thus, it can be obtained that:

$$N_d = \frac{mN}{2m - 10k}. \tag{13}$$

When a rightward displacement distance of the mobile terminal is $d_1$, the magnetic flux in the solution that double coils coincide is:

$$\Phi_1 = 2 \times (-kd_1 + m) \times \frac{N}{2} = Nm - Nkd_1, \tag{14}$$

and the magnetic flux in the solution that double coils overlap is:

$$\Phi_2 = N_d \times (-k|-5+d_1|+m) + N_d \times (-k|5+d_1|+m) \tag{15}.$$

When the displacement distance $d_1 < 5$ mm, the equation (15) may be simplified to:

$$\Phi_2 = N_d(d_1 k - 5k + m) + N_d(-5k - d_1 k + m) = \tag{16}$$
$$\frac{mN}{2m - 10k}(2m - 10k) = mN,$$

and it is obvious that $\Phi_2 > \Phi_1$ at this time.

When the displacement distance $d_1 > 5$ mm, the equation (15) may be simplified to:

$$\Phi_2 = N_d(5k - d_1 k + m) + N_d(-5k - d_1 k + m) = \tag{17}$$
$$\frac{mN}{2m - 10k}(2m - 2d_1 k) = mN \times \frac{m - d_1 k}{m - 5k}.$$

By further separating the equation (17), the following equation may be obtained:

$$\Phi_2 = \frac{mN \times (m - 5k) + Nkd_1(-m + 5k) + 5Nk(m - kd_1)}{m - 5k} = \tag{18}$$
$$mN - Nkd_1 + 5Nk \times \frac{m - d_1 k}{m - 5k}.$$

When the displacement distance of the coils is short, the magnetic fluxes generated by the two coils are both positive values, so that $$\frac{m - d_1 k}{m - 5k} > 0.$$

Accordingly, $\Phi_2 > \Phi_1$.

As can be seen from the above theory, when the geometrical center of the receiving coils is close to the center of the transmitting coil, the magnetic flux in the solution that double coils overlap is larger than the magnetic flux in the solution that double coils coincide, and thus the solution that double coils overlap has a larger chargeable scope than the solution that double coils coincide. Therefore, the solution that double coils overlap may alleviate the phenomenon that charging is stopped due to the displacement.

To sum up, in the solution that coils coincide, by reducing the number of windings of the coils, heat generation of the receiving terminal is reduced obviously, but the phenomenon that charging is stopped due to the displacement easily occurs. In the solution that coils overlap, by choosing the suitable number of windings for each of the coils, it is ensured that the induction voltage generated when the geometrical center thereof is at a central position remains the same, so that the phenomenon that charging is stopped due to the displacement can be alleviated.

Figure 9:
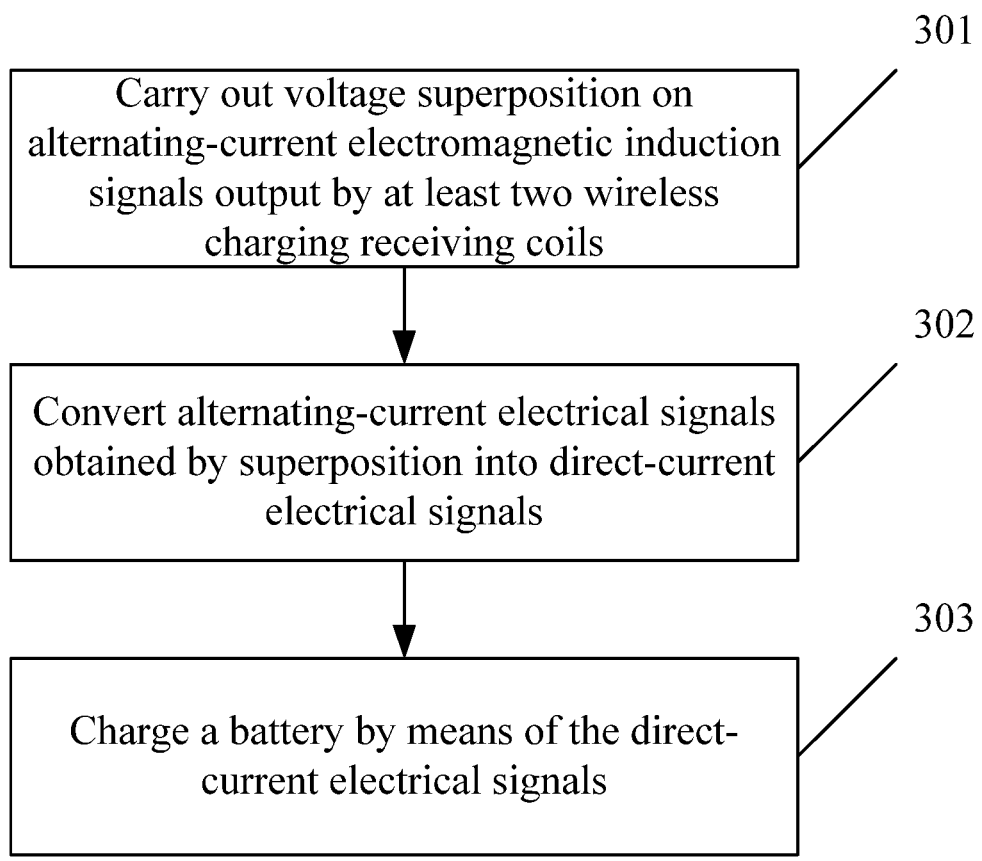
FIG. 9 is a flowchart of a method for realizing wireless charging according to an embodiment of the present disclosure.

Correspondingly, as shown in FIG. 9, a method for realizing wireless charging according to an embodiment of the present disclosure includes:

step 301 of carrying out voltage superposition on alternating-current electromagnetic induction signals output by at least two wireless charging receiving coils;

step 302 of converting alternating-current electrical signals obtained by superposition into direct-current electrical signals; and step 303 of charging a battery by means of the direct-current electrical signals.

In an embodiment, the method further includes steps of:

detecting a magnetic induction intensity or magnetic induction intensities generated by one of more of the at least two wireless charging receiving coils; and determining that a criterion for stopping charging is met based on the magnetic induction intensity or the magnetic induction intensities, and stopping wireless charging.

A maximum value of a magnetic flux through a wireless charging receiving coil is determined based on the magnetic induction intensity and an area of the wireless charging receiving coil. When the maximum value of the magnetic flux is smaller than a first threshold (in the case where the wireless charging receiving coils coincide), or when a sum of maximum values of respective magnetic fluxes through the wireless charging receiving coils is smaller than the second threshold, it is determined that the criterion for stopping charging is met.

In the present embodiment, by stop wireless charging when the criterion for stopping charging is met, a circumstance of serious heat generation due to a large transmitting power of the wireless charging transmitting apparatus when the wireless receiving coils is far from a central position of the wireless charging transmitting coil.

An application example is illustrated below.

Figure 10:
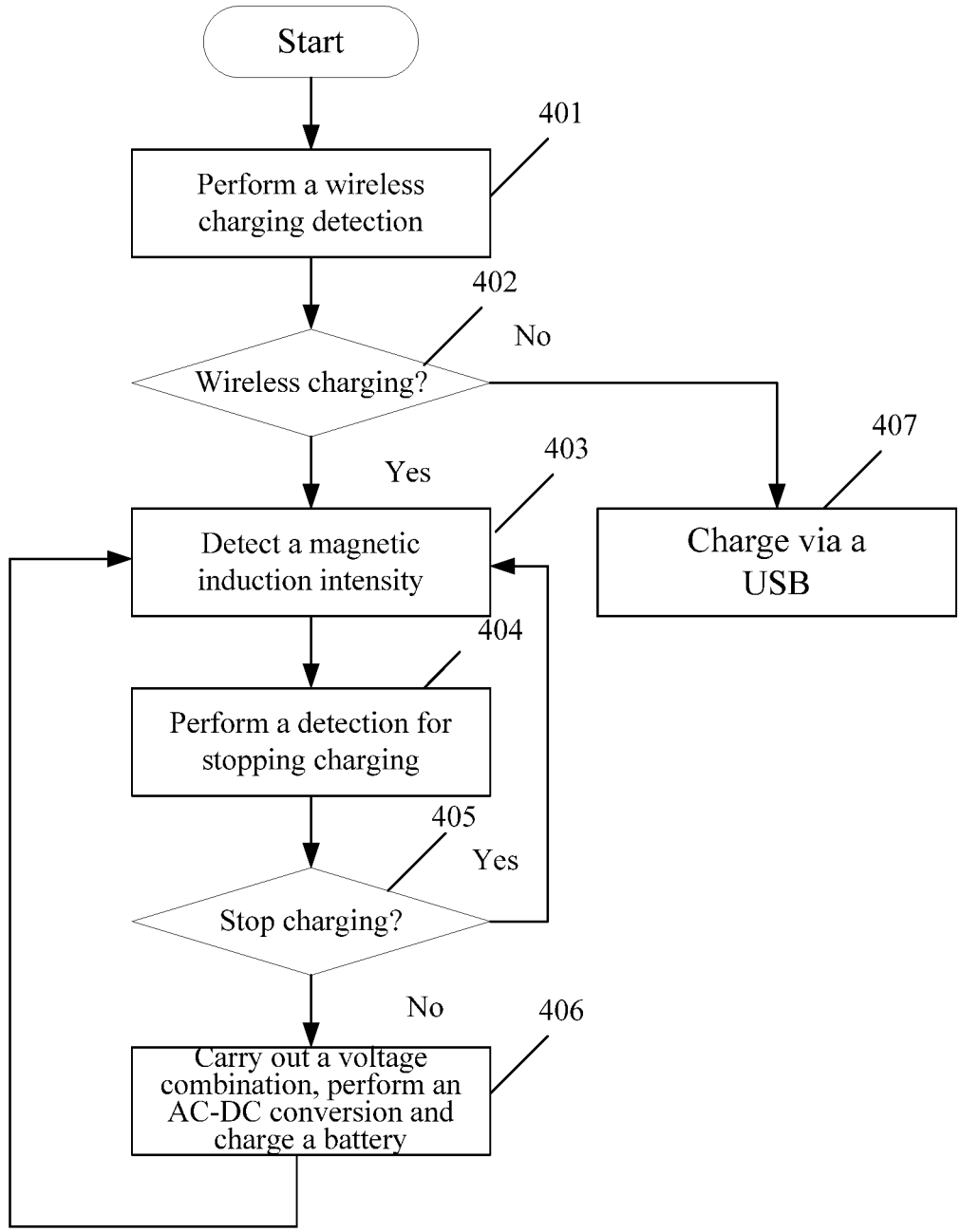
FIG. 10 is a flowchart of a method for realizing wireless charging according to an application example of the present disclosure.

As shown in FIG. 10, a charging process may include the following steps:

step 401, a wireless charging detection is performed; for example, it is detected whether a wireless charger is connected; and by default, a USB (universal serial bus) charging mode is used;

step 402, it is determined whether to perform wireless charging; if the answer is yes, step 403 is performed; and if the answer is no, step 407 is performed;

step 403, a magnetic induction intensity is detected;

step 404, a maximum magnetic flux is determined, and a detection for stopping charging is performed;

in a solution that coils coincide, calculation to the maximum magnetic flux may only be performed to one receiving coil; and in a solution that coils overlap, maximum magnetic fluxes of respective receiving coils are calculated and added;

step 405, it is determined whether to stop charging; if the answer is yes, a baseband processor gives a voltage combination module a notice to stop wireless charging, and the process returns to step 403; and if the answer is no, step 406 is performed;

step 406, the voltage combination module carries out voltage combination; after an AC-DC conversion is performed, a battery is charged; and the process returns to step 403; and step 407, charging is performed via a USB.

An embodiment of the present disclosure further provides a mobile terminal, and the mobile terminal includes an antenna of the above mobile terminal.

The mobile terminal may be implemented in various forms. For example, the mobile terminal described in the present embodiment may include a mobile terminal such as a mobile phone, a smart phone, a laptop computer, a digital broadcast receiver, a PDA (personal digital assistant), a PAD (tablet computer), a PMP (portable media player), a navigation device and so on. However, it would be understood by those skilled in the art that, in addition to an element used specifically for the purpose of mobility, the configuration according to embodiments of the present disclosure may also be applied to a fixed terminal, such as a digital TV, a desk computer and so on.

Although the embodiments of the present disclosure are disclosed as above, the above embodiments are described only for better understanding, rather than restricting, the present disclosure. Any person skilled in the art can make any amendment or change to the implementing forms or details without departing from the spirit and scope of the present disclosure. The protection scope of the present disclosure shall be determined by the scope as defined in the claims.

The invention claimed is:

1. A wireless charging receiving apparatus, comprising a wireless charging conversion module and a charging management module which are interconnected and further comprising a voltage combination module and at least two wireless charging receiving coils, wherein the at least two wireless charging receiving coils are respectively connected to the voltage combination module, and are used to couple with a wireless charging transmitting coil in a wireless charging transmitting apparatus and output alternating-current electromagnetic induction signals to the voltage combination module;

the voltage combination module is connected to the wireless charging conversion module, and is used to carry out voltage superposition on the alternating-current electromagnetic induction signals output by the at least two wireless charging receiving coils and output superposed alternating-current electrical signals to the wireless charging conversion module;

the wireless charging conversion module is used to convert received alternating-current electrical signals into direct-current electrical signals and output the direct-current electrical signals to the charging management module; and the charging management module is used to charge a battery by means of received direct-current electrical signals, and wherein the apparatus further comprises a detection module, a decision-making module and a baseband processor which are connected sequentially, wherein the detection module is connected to one of the at least two wireless charging receiving coils, and is used to detect a magnetic induction intensity of the wireless charging receiving coil connected thereto;

the decision-making module is used to determine that a criterion for stopping charging is met based on the magnetic induction intensity detected by the detection module and give the baseband processor a notice to stop wireless charging; and the baseband processor is connected to the voltage combination module, and is used to control the voltage combination module to stop wireless charging based on the notice given by the decision-making module.

2. The wireless charging receiving apparatus according to claim 1, wherein the at least two wireless charging receiving coils are superposed, and central axes of the at least two wireless charging receiving coils coincide.

3. A mobile terminal, comprising the wireless charging receiving apparatus according to claim 2.

4. The wireless charging receiving apparatus according to claim 1, wherein the decision-making module is used to determine a maximum value of a magnetic flux through the wireless charging receiving coil based on the magnetic induction intensity and an area of the wireless charging receiving coil and determine that the criterion for stopping charging is met when the maximum value of the magnetic flux is smaller than a first threshold.

5. A mobile terminal, comprising the wireless charging receiving apparatus according to claim 4.

6. The wireless charging receiving apparatus according to claim 1, wherein the at least two wireless charging receiving coils are superposed, wherein central axes of the at least two wireless charging receiving coils do not coincide.

7. The wireless charging receiving apparatus according to claim 6, wherein the apparatus further comprises at least two detection modules, a decision-making module and a baseband processor, wherein the detection modules are in an one-to-one relationship with the wireless charging receiving coils, and each of the detection modules is connected to one of the wireless charging receiving coils and is used to detect an magnetic induction intensity of the wireless charging receiving coil connected thereto;

the decision-making module is used to determine that a criterion for stopping charging is met based on magnetic induction intensities detected by the detection modules and give the baseband processor a notice to stop wireless charging; and the baseband processor is connected to the voltage combination module, and is used to control the voltage combination module to stop wireless charging based on the notice given by the decision-making module.

8. The wireless charging receiving apparatus according to claim 7, wherein the decision-making module is used to determine a maximum value of a magnetic flux through each of the wireless charging receiving coils based on the magnetic induction intensity detected by each detection module and an area of each of the wireless charging receiving coils, and determine that the criterion for stopping charging is met when a sum of maximum values of magnetic fluxes through respective wireless charging receiving coils is smaller than a second threshold.

9. A mobile terminal, comprising the wireless charging receiving apparatus according to claim 7.

10. A mobile terminal, comprising the wireless charging receiving apparatus according to claim 6.

11. A mobile terminal, comprising the wireless charging receiving apparatus according to claim 5.

12. A mobile terminal, comprising the wireless charging receiving apparatus according to claim 1.

\* \* \* \* \*